(12) United States Patent
Birnbach

(10) Patent No.: US 8,934,599 B2
(45) Date of Patent: Jan. 13, 2015

(54) SYSTEM FOR INERTIALLY COMPRESSING A FUSION FUEL PELLET WITH TEMPORALLY SPACED X-RAY PULSES

(75) Inventor: Curtis A. Birnbach, New Rochelle, NY (US)

(73) Assignee: Advanced Fusion Systems LLC, Newtown, CT (US)

( * ) Notice: Subject to any disclaimer, the term of this patent is extended or adjusted under 35 U.S.C. 154(b) by 1017 days.

(21) Appl. No.: 12/550,276

(22) Filed: Aug. 28, 2009

(65) Prior Publication Data

US 2010/0104058 A1  Apr. 29, 2010

Related U.S. Application Data

(60) Provisional application No. 61/190,435, filed on Aug. 28, 2008, provisional application No. 61/211,449, filed on Mar. 30, 2009.

(51) Int. Cl.
*G21B 1/03* (2006.01)
*G21B 1/23* (2006.01)
*G21B 1/19* (2006.01)

(52) U.S. Cl.
CPC . *G21B 1/19* (2013.01); *Y02E 30/16* (2013.01); *G21B 1/03* (2013.01)
USPC .......................................... 376/103; 376/107

(58) Field of Classification Search
CPC .............. G21B 1/03; G21B 1/23; G21G 4/02; H05H 1/22; Y02E 30/16
USPC .......... 376/100, 102, 103, 104, 105, 107, 114
See application file for complete search history.

(56) References Cited

U.S. PATENT DOCUMENTS

| | | | |
|---|---|---|---|
| 3,489,645 A | 1/1970 | Daiber et al. | |
| 3,969,628 A | 7/1976 | Roberts et al. | |
| 4,058,486 A | 11/1977 | Mallozzi et al. | |
| 4,172,008 A | 10/1979 | Fleet | |
| 4,440,714 A | 4/1984 | Rose | |
| 2007/0098129 A1 | 5/2007 | Edwards et al. | |

(Continued)

OTHER PUBLICATIONS

Landau and Lifschitz, Course in Theoretical Physics, vol. 5, 3rd Edition Part 1, pp. 166-168: "A degenerate electron gas", Pergamon Press 1980.*

(Continued)

*Primary Examiner* — Jack W Keith
*Assistant Examiner* — Daniel Wasil
(74) *Attorney, Agent, or Firm* — Bruzga & Associates; Charles E. Bruzga

(57) ABSTRACT

Systems for enhancing preignition conditions of a fusion reaction are disclosed. A first system includes a target chamber for receiving a fusion fuel, and energy driving means oriented to direct plasma confinement structure onto to the fusion fuel to facilitate ignition of a controlled fusion reaction of said fusion fuel. A plurality of electron sources provides electron beams of a predetermined energy and one of fluence and quantity, directed onto and illuminating, a fusion fuel-derived plasma for controlling the ratio of ion temperature and electron temperature of the plasma. A second system comprises a central target chamber for receiving a spherical pellet of fusion target material and at least first and second pluralities of energy drivers oriented to supply temporally-staged X-ray pulses to the fusion target material in a 3-dimensionally symmetric manner about said pellet. A third system combines aspects of the first and second systems.

4 Claims, 9 Drawing Sheets

(56) References Cited

U.S. PATENT DOCUMENTS

| | | |
|---|---|---|
| 2007/0201598 A1 | 8/2007 | Lerner et al. |
| 2008/0063132 A1* | 3/2008 | Birnbach .................. 376/107 |
| 2012/0155590 A1* | 6/2012 | Murakami et al. ............ 376/100 |

OTHER PUBLICATIONS

Alexandrov et al, Principles of Electrodynamics, pp. 5-6: "Plasmas in Thermodynamic Equilibrium and Quasiequilibrium. The Maxwell and Fermi Distribution Functions".*

Linford et al, "A Review of the U.S. Department of Energy's Inertial Fusion Energy Program", Journal of Fusion Energy vol. 22, No. 2, Jun. 2003, pp. 93-126.*

McCrory et al, "Progress in direct-drive inertial confinement fusion", Physics of Plasmas 15, 055503 (8 pp) Apr. 2008.*

Cuneo et al, "Optimal X-Ray Pulse Compression with Compact Nested Wire Arrays on Z*", Plasma Science Jun. 2007, ICOPS 2007, p. 278.*

Roth, M., "Review on the current status and prospects of fast ignition in fusion targets driven by intense, laser generated proton beams", Plasma Physics and Controlled Fusion vol. 51, 014004 (7 pp) (2009).*

Seife, Ch., "Sun in a bottle", Chapter 5, "Heat and Light", pp. 102-126 (Penguin Group, 2008).*

Keskinen et al, "Nonlinear spectrum of the ablative Rayleigh-Taylor instability in laser-accelerated planar plasmas", Physics of Plasmas 14, 012705 ( Jan. 2007).*

"fusion reactor", from The Penguin Dictionary of Physics (2009).*

Malmberg et al., "Plasma Wave Echo Experiment", Physical Review Letters 20(3), pp. 95-97 (Jan. 1968).*

Fabre et al., "Progress in Inertial Confinement Fusion", Plasma Physics and Controlled Fusion, vol. 30, No. 11, pp. 1535-1548 (1988).*

Collins et al.,"Reduction of the ablative Rayleigh-Taylor growth rate with Gaussian picket pulses", Physics of Plasmas, vol. 11, No. 4, pp. 1569-1576 (Apr. 2004).*

Yamaguchi et al, Bremsstrahlung Energy Loss of Degenerate Plasma, Research Report, Mar. 1982, pp. 1-7, 553, National Institute for Fusion Science, Japan.

Son et al, Aneutronic fusion in a degenerate plasma, Physics Letters, Section A: General, Atomic and Solid State Physics, 2004, pp. 76-82, 329, United States.

Glasstone et al, Controlled Thermonuclear Reactions: An Introduction to Theory, and Experiment, 1960, pp. 29-35, D. Van Nostrand Co., Inc., Princeton, New Jersey.

Lawson, J.D. Some Criteria for a Useful Thermonuclear Reactor, Atomic Energy Research Establishment, 1955, Harwell Berks.

Rider, Todd, "A General Critique of Inertial-Electrostatic Confinement Fusion Systems", (1994) Massachusetts Institute of Technology. Cambridge, MA USA.

* cited by examiner

SYSTEM FOR INERTIALLY COMPRESSING A FUSION FUEL PELLET WITH TEMPORALLY SPACED X-RAY PULSES

CROSS-REFERENCE TO RELATED APPLICATIONS

This application claims priority from U.S. Provisional Application No. 61/190,435 filed Aug. 28, 2008 for Electron Enhanced Multi Frequency Pumping of Fusion Reactions by Curtis A. Bimbach and also claims priority from U.S. Provisional Patent Application No. 61/211,449 filed Mar. 30, 2009 for Method of Reduction of Hydrodynamic Instabilities in Fusion Reactions by Curtis A. Bimbach, the contents of each of which is herein incorporated by reference.

FIELD OF THE INVENTION

This invention relates to various techniques of enhancing preignition conditions of thermonuclear fusion reactions. More particularly, the invention relates to concepts including (a) injecting electrons of predetermined energy, and quantity or fluence, into a fusion fuel plasma, and (b) temporally-staged pumping of a fusion reaction, which may be practiced alone or in combination with each other.

BACKGROUND OF THE INVENTION

Thermonuclear fusion reactions occur when two light atomic nuclei fuse together to form a heavier nucleus. In doing so, the fusion reaction releases a large amount of energy. This specification describes three techniques for enhancing preignition conditions of fusion reactions.

1. Injection of Electrons into Fusion Fuel Plasma

The first technique for enhancing preignition conditions of fusion reactions relates to achieving the correct ion and electron temperature ratio to facilitate the ignition of a thermonuclear fusion reaction. As is known in the art, there is an apparent contradiction in the pumping requirements for pumping fusion fuel to create conditions suitable for igniting the fuel to produce a plasma. On one hand, in order to achieve proper compression, the X-ray pumping energy cannot be too high or the X-rays will pass through the target with minimal interaction. On the other hand, it is desirable to pump the plasma to a very high temperature, which, for example, is around 100 KeV for a proton-$^{11}$Boron reaction (p-$^{11}$B), to facilitate ignition of a fusion plasma.

Further, it is useful to control the specific ratio between the ion temperature and the electron temperature. Plasma temperature of ions or electrons is commonly measured in degrees Kelvin (° K) or electron Volts (eV), and is a measure of the thermal kinetic energy per particle.

An important consideration is whether the fusion fuel plasma is degenerate or not. In physics, degeneracy refers to the density of particles at the same energy level (i.e., ions, electrons, nuclei and neutrons). A plasma above a certain density is referred to as being degenerate; a plasma below a lower density is referred to as non-degenerate; and a plasma between those two densities is referred to as partially degenerate.

Classical analysis has shown that if the temperature difference between the ions and electrons in a fusion fuel plasma is too great, then the energy from the ions drains to the electrons potentially quenching the reactions. However, Son, S. and Fisch, N.J., Aneutronic fusion in a degenerate plasma (2004), *Physics Letters, Section A: General, Atomic and Solid State Physics*, 329 (1-2) (2004), pp. 80-81 (hereinafter, "Son et al.") teaches a different point of view. The following discussion is derived from Son et al.

If the electrons are completely degenerate, then the drag on an ion comes mainly from the electrons. The force from electrons does not cancel in contrast to the classical limit. This is because, due to the lack of the asymmetry of the electron-hole transition probability, the drag force of electrons on an ion is not exactly an inverse-square law force. The drag force depends on the direction relative to the ion-velocity. The cancellation, however, occurs only for inverse-square forces. Completely degenerate electrons do not drag the ion because these electrons do not collide with the ion due to the lack of available holes. In the p-$^{11}$B fusion reaction, a large reduction of the stopping frequency for an appropriate electron temperature is anticipated.

The Bremsstrahlung is also reduced by this process. Bremsstrahlung is a form of high-energy ionizing radiation that occurs as a result of the deceleration of electrons. The literal translation from German is "Braking Radiation". As taught by Yamaguchi, Kawata et al., *Bremsstrahlung Energy Loss of Degenerate Plasma*, National Institute for Fusion Science (Japan), NII Electronic Library Service, six pages, an electron with a velocity $v_e$ at infinity collides with an ion located at the origin. The radiation energy (so-called effective radiation) $dq_v$ emitted from the electron in the frequency interval $dv$ is given by:

$$dq_v = \frac{32\pi^2 Z^2 e^6}{3\sqrt{3}\, m_e^2 c^3 v_e^2} dv,$$

where Z is the atomic number of ion, -e the electron charge, $m_e$ the electron mass and c the speed of light.

Referring again to Son et al., when the ion temperature, a measure of ion energy, is significantly greater than electron temperature, a measure of electron energy, not all electrons collide with the ions, since many of the electron-hole transitions are forbidden. The estimate, using the classical derivation of the Bremsstrahlung, shows that the total loss will be reduced by $O((T/E_F)^{3/2})$ from the classical formula. If the Bremsstrahlung is reduced to a level where the electrons begin to heat up, it is then desirable to add small amounts of a high-Z impurity (doping) into the fuel so as to fine tune the Bremsstrahlung to balance with the ion-electron energy transfer at the optimal electron temperature.

As further taught by Son et al., at such a high density as $10^{29}$ cm$^{-3}$, a significant fraction of the energy radiated will be reabsorbed, given the fact that the electron temperature is a few tens of KeV. The Compton heating of the electrons also turns out to be significant. It is clear to the extent that these effects tend to reduce the coupling of the electrons, and it will be even easier to maintain disparate ion and electron temperature and hence greater activity. There is a possible ignition regime for p-$^{11}$B where:

$\rho > 10^5$ g/cm, $T_i \approx 100$ KeV, and $T_e = 30$ KeV.

Son et al. also teaches that the degeneracy of the electrons reduces the stopping power and the Bremsstrahlung losses, which, in turn, facilitates self-sustained burning. It is mainly the reduction in the stopping power of the electrons that enables such a large differential between ion and electron temperature to be maintained to achieve a favorable result.

In summary, the foregoing discussion teaches that control of the ion-to-electron temperature ratio of fusion fuel plasma enhances preignition conditions of a fusion reaction. On the basis of the foregoing discussion, the present inventor has surmised that for achieving a desired ratio, it would be desirable to have control over the energy, and the quantity or fluence, of the electrons injected into the reaction.

2. Temporally-Staged Pumping of a Fusion Reaction

The second technique for enhancing preignition conditions of a fusion reaction relates to reduction of hydrodynamic instabilities in inertial confinement fusion reactions. Hydrodynamic instability has been the bane of researchers in nuclear and thermonuclear physics since the inception of nuclear technology during the Second World War in the Manhattan Project in the U.S.A. It is a phenomenon where the symmetry of a reaction is reduced by any of a variety of degrading processes. Small perturbations to a plasma in hydrodynamic equilibrium release free energy in a manner which allows these perturbations to grow. This leads to non-uniform heating and, in the case of fusion reactions, a collapse of the reaction before it reaches maximum energy. It, would, therefore, be desirable to provide techniques for driving a fusion reaction to minimize the potential for the formation of hydrodynamic instabilities and to reduce those that may occur.

3. Combination of Techniques

The third technique for enhancing preignition conditions of a fusion reaction combines the first and second techniques mentioned above. This provides a variety of techniques to exercise control of the preignition stage of a thermonuclear reaction. Six discrete combinations of steps are described below, but other techniques may be used in any of the combinations.

BRIEF SUMMARY OF THE INVENTION

One form of the invention concerns a system for enhancing preignition conditions of a fusion reaction. The system includes a target chamber for receiving a fusion fuel, and energy driving means oriented to direct plasma confinement means onto the fusion fuel to facilitate ignition of a controlled fusion reaction of said fusion fuel. An improvement comprises a plurality of electron sources providing electron beams of a predetermined energy and one of fluence and quantity, directed onto and illuminating, a fusion fuel-derived plasma for controlling the ratio of ion temperature and electron temperature of said plasma.

By controlling the ratio of ion temperature to electron temperature of the plasma, the preignition conditions for a fusion reaction are beneficially enhanced.

A second form of the invention concerns a system for enhancing other preignition conditions of a fusion reaction. The system comprises a central target chamber for receiving a spherical pellet of fusion target material and at least first and second pluralities of energy drivers oriented to supply X ray pulses to the fusion target material in a 3-dimensionally symmetric manner about said pellet. The first and second pluralities of energy drivers supply to the fusion target material first and second temporally-spaced groups of X-ray pulses. The second group is supplied after an interval of time from when the first group is supplied, as a preignition condition of said fusion target material.

Supplying temporally-spaced energy pulses to the plasma serves to reduce hydrodynamic instability of the plasma.

A third form of the invention combines the electron enhancement feature of the first form of the invention with one or more elements of the temporally-staged energy pulses of the second form of the invention. Combinations of the first and second forms of the invention further enhance preignition conditions of a fusion reaction.

BRIEF DESCRIPTION OF THE DRAWINGS

In the drawings, in which like reference numerals refer to like parts.

DETAILED DESCRIPTION OF THE INVENTION

Some embodiments of the present invention combine different technologies respectively described in the two different, above-cited provisional patent applications to produce enhanced control of preignition conditions of thermonuclear fusion reactions. A first technology relates to injecting electrons of predetermined energy, and quantity or fluence, into a fusion fuel plasma for controlling the ratio of ion temperature to electron temperature, to achieve better control of the reaction and to reduce hydrodynamic instability. A second technology relates to temporally-staged pumping of fusion reactions, with one object being to further reduce hydrodynamic instabilities of fusion fuel plasma. However, each technology stands on its own as a valid technique for enhancing preignition conditions of fusion reactions. As a third technology, both technologies combined yield an enhanced level of control of preignition conditions of a fusion reaction.

The first through third technologies of the invention are described as follows:

1. Active Control of Ion-to-Electron Temperature Ratio

Figure 1:
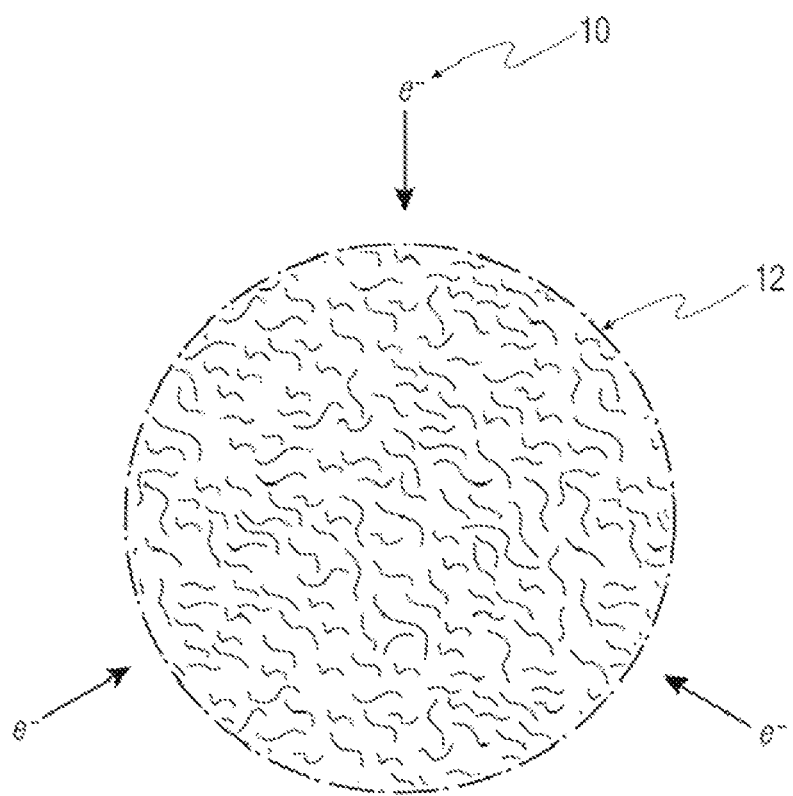
FIG. 1 shows a schematized view of electrons being injected into a plasma.

The first technology, relating to electron enhancement of a fusion plasma, is a useful means of providing fine control of small-scale thermonuclear reactions. It allows one to adjust the ion temperature to electron temperature ratio, thus altering the burn characteristics of the reaction. Electron enhancement is useful no matter what state of degeneracy the plasma is in, "degeneracy" being defined in the Background of the Invention above. However, the necessary level of electron enhancement varies with the degree of degeneracy of the plasma. FIG. 1 illustrates electrons 10 being injected into a fusion fuel plasma 12 (hereinafter "plasma"). By providing electron enhancement structures in a fusion reactor design, operation in different degeneracy regimes can be economically achieved. It is taught in the prior art that there is a critical balance between ion temperature and electron temperature. With electron enhancement (injection) at the correct temperature (KeV), optimal conditions for burning fusion fuel can be achieved more readily. This process can be further fine-tuned by controlled doping of the fuel with selected amounts of high-Z materials.

Figure 2:
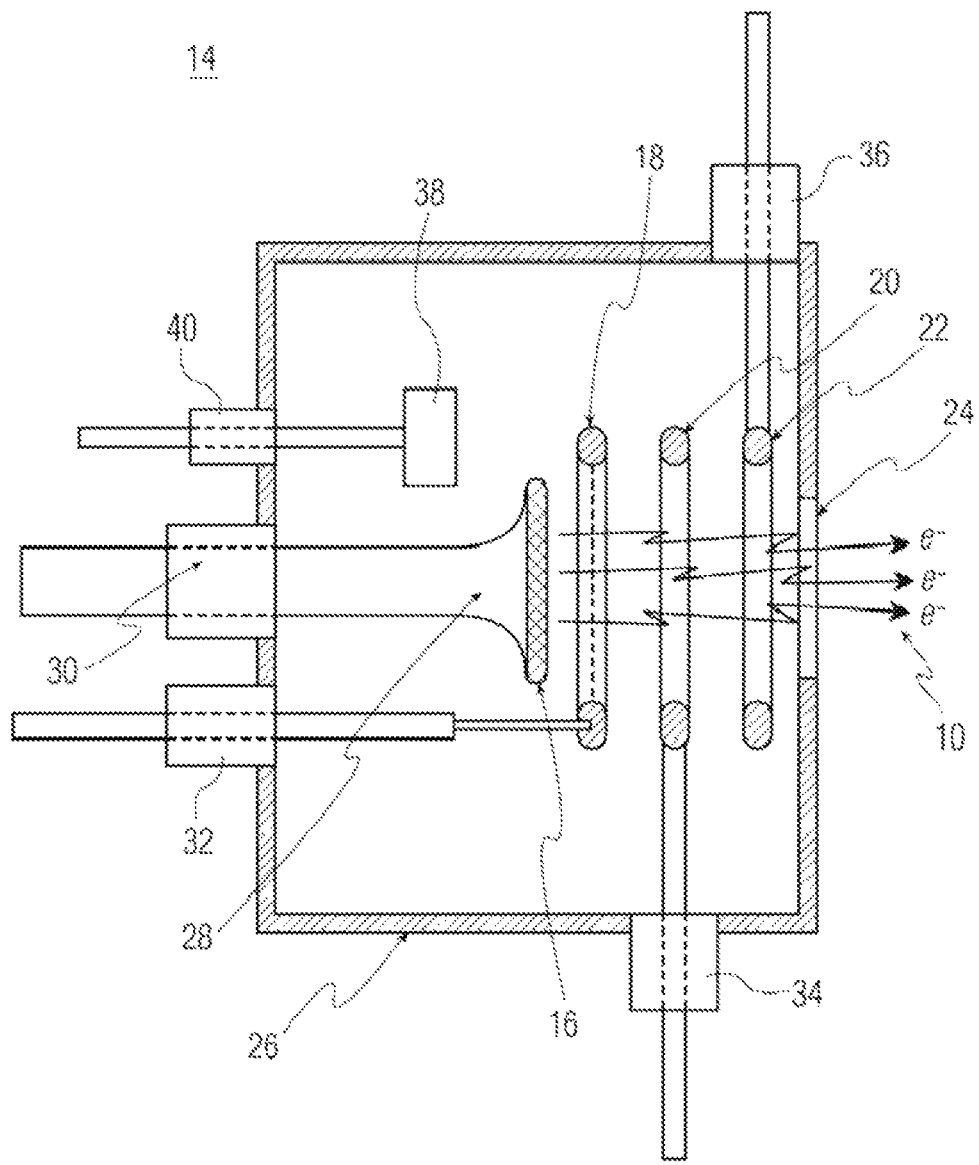
FIG. 2 shows a simplified view, partially in cross section, of a preferred electron gun.

FIG. 2 shows a preferred electron gun 14, including a cathode 16 that emits electrons 10. The electrons 10 are accelerated by a series of electrodes 18, 20 and 22 through an aperture 24 towards the plasma 12 (FIG. 1). The electron gun 14 is mounted in a housing 26 of non-magnetic, vacuum-tight construction. The cathode 16 is mounted on a cathode support 28, which penetrates the rear wall of the enclosure 26 through a vacuum-tight, electrically insulated feedthrough 30. The left-shown end of the cathode support 28 emerges from the feedthrough 30 and serves as an electrical connection point for receiving power. The grid 18 and accelerator electrodes 20 and 22 serve to control and extract the beam of electrons 10 and focus it on the plasma 12. Vacuum-tight, electrically insulated feedthroughs 32, 34 and 36 mechanically support and provide electrical connection to the grid 18 and accelerator electrodes 20 and 22, respectively. A chemical getter pump 38 helps maintain the vacuum in housing 26. A vacuum-tight, electrically insulated feedthrough 40 provides mechanical support and electrical connection to the getter pump 38.

The prior art teaches that while electron enhancement is desirable for plasmas in any state of degeneracy, (i.e., degenerate, non-degenerate or partially degenerate), maximum efficiency can be achieved by implementation with degenerate plasmas.

It has been shown by Son et al., described in the Background of the Invention, above, that if the temperature difference between the ions and electrons in a plasma resulting from burning of a fusion fuel is too great, then the energy from the ions drains to the electrons, potentially quenching the reactions. According to the present invention, the electron sources permeate the targeted fuel plasma with high energy electrons. To allow for slight deviations in the trajectory of each individual fuel pellet, it is preferred to permeate, not only the targeted fuel plasma, but also an additional volume beyond the boundary of the targeted fuel, wherein the additional volume represents, for example, 1 percent of the maximum dimension of the targeted fuel plasma, as measured along a line passing through the geometric center of the targeted fuel plasma. The energy level of the electrons is adjustable to achieve the correct electron temperature in the plasma of the targeted fuel by injection of electrons at the desired temperature. This is done by changing the voltage on the power supply attached to the electron sources. The trajectories of the electrons are controlled by either electromagnetic or electrostatic focusing means such as accelerator electrodes 20 and 22 in FIG. 4, as described below.

Figure 3:
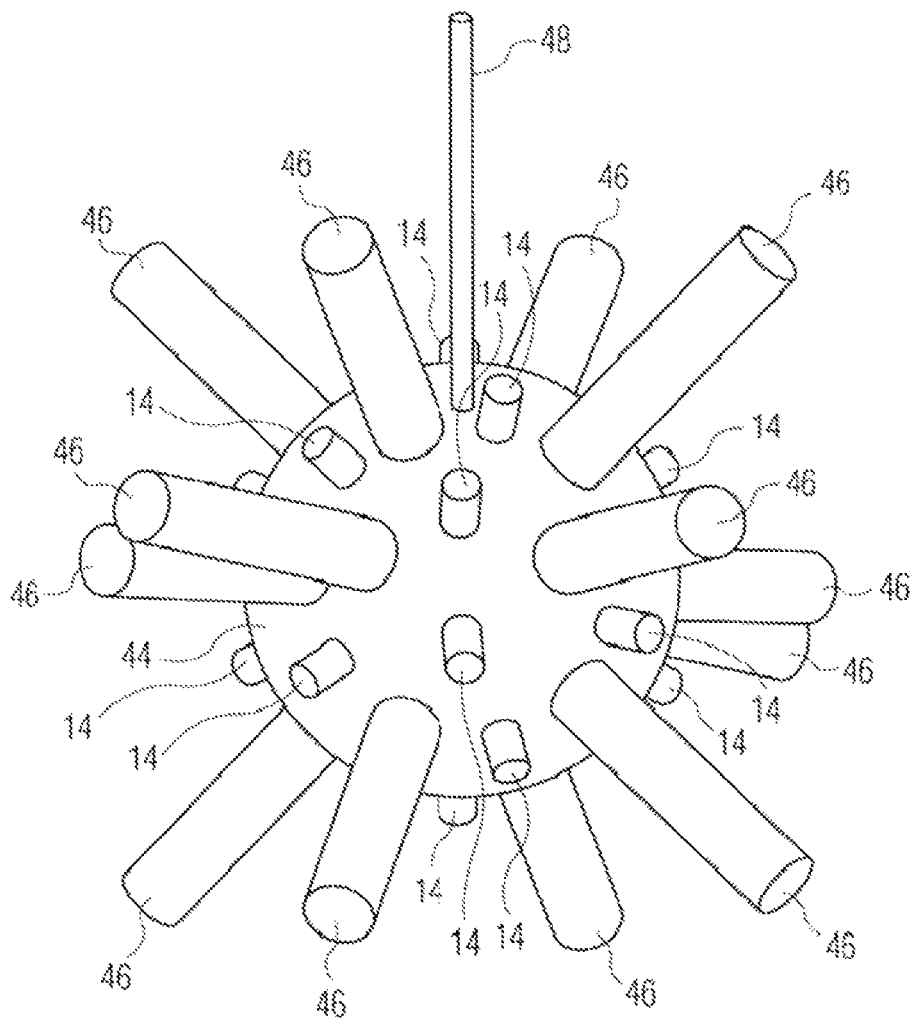
FIG. 3 shows a simplified perspective view of a preferred fusion reactor incorporating X-ray laser drivers and separate electron guns.

It is necessary to introduce the electrons separately from the energy driving means. This arrangement has the advantage of allowing fine tuning of the electron energy to meet specific requirements of the reaction without compromising the RF heating capabilities disclosed in U.S. Patent Application Publication US 2008/0063132 A1 dated Mar. 13, 2008, also by the present inventor C. A. Birnbach. The foregoing publication is referred to hereinafter as the "'132 publication". Thus, FIG. 3 shows a preferred fusion reactor 42 comprising a central, spherical vacuum vessel 44. A plurality of X-ray lasers 46 and a plurality of electron guns 14 are symmetrically arranged on the surface of the vessel 44 about the center of vessel 44. The fuel pellet injector 48 connected to the vacuum vessel 44 is shown.

Figure 4:
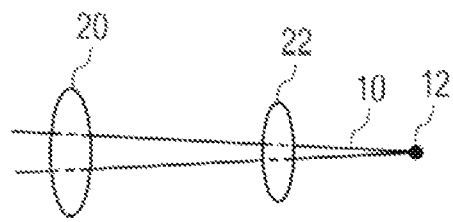
FIG. 4 shows a simplified side plan view of focusing means for an electron beam.
Figure 5:
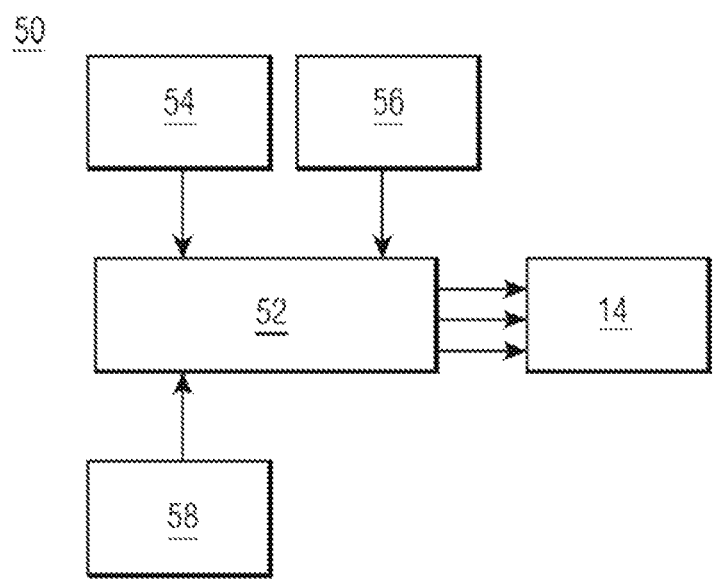
FIG. 5 shows a block diagram of a user interface for electron guns.

In order to properly illuminate the fusion fuel, a plurality of electron guns 14 is disposed through $4\pi$ steradians and focused on the plasma 12 (FIG. 1), preferably symmetrically about the plasma. Focusing of beams of electrons 10 (FIG. 1) may be accomplished as shown in FIG. 4. In that figure, electrodes 20 and 22 (also shown in FIG. 2) focus the beam of electrons 10 onto the centroid of the plasma 12. The grid 18 serves to control and modulate the flow of electrons to the aperture 24 and allows synchronization of the timing of the pulses. Preferably, all electron sources have the same energy (electron Volts [eV]) and fluence (Amps). In order to assure that all electron sources have the desired energy and fluence, an electron gun controller 50 as shown in FIG. 5 is provided. The electron gun controller 50 comprises a high voltage power supply 52 having a user-controlled voltage input 54 and a user-controlled current input 56. User-controlled inputs 54 and 56 are one variety of controlled input that may be used. A host computer 58 is connected to the electron gun controller 50 to provide system level control. The high voltage power supply 52 provides all necessary voltages and control signals for the electron gun 14 under the control of the host computer 58.

As one possible example, a plurality of six orthogonally disposed electron sources arranged symmetrically around the fusion fuel target may be used to achieve the desired degree of uniformity, where each source illuminates approximately ⅙th of the surface area of the fusion fuel target. Other numbers of electron sources will be apparent to persons of ordinary skill in the art based on the present specification. The electron sources may comprise any type of electron gun as long as they meet the requirements of energy, quantity or fluence, and ability to synchronize, set forth herein.

It is desirable for the electron sources to permeate the targeted fusion fuel plasma region with a predetermined number of electrons at a predetermined energy, specific to the fusion fuel system in use. The grid 18 allows synchronization and control of the quantity of electrons. The resulting confluence of electrons serves the purpose of providing the correct number of electrons relative to the number of ions present to achieve a desired ratio of ions to electrons. The ion temperature can be determined from the composition of the fusion fuel and the energy of the pumping X-ray beams. From the ion temperature, the required voltage setting for the electron source power supply to achieve the desired ion temperature to electron temperature ratio can be determined. The quantity of electrons is determined by the number of atoms in the supplied fusion fuel as regulated by the action of the grid 18.

Son et al. teaches that, to avoid Bremsstrahlung losses, the electron temperature ($T_e$) must be much lower than the ion temperature ($T_i$). The electron temperature $T_e$ cannot be too low because the fusion byproducts would then be preferentially stopped by the ions. In view of this consideration, the electron temperature must be in a narrow range to preserve the possibility of self burning. The electron temperature $T_e$ is determined from the balance between the energy input from the ions and the losses from the Bremsstrahlung. The ratio of $T_i$ to $T_e$ varies with the fusion fuel used. For instance, for the typical fusion fuels such as Deuterium-Deuterium, Deuterium-Tritium, Deuterium-$^3$Helium, Proton-$^6$Lithium, Proton-$^{11}$Boron, the ratio typically varies between 2:1 and 20:1.

Preferably, a plurality of electron sources provide electron beams of a predetermined energy, and fluence or quantity, are directed onto and illuminating, the fusion fuel plasma. Preferably, all the electron sources have their respective voltage within one tenth of a percent of each other, and all have their respective current within a one-fourth of a percent of each other, assuming that the electron sources are disposed so that their electron beams are symmetrically oriented about the fusion fuel target plasma. Preferably, the number of electron sources used results in a specified number of electrons per unit volume of the fusion fuel plasma that is within 10 percent of any other unit volume within the plasma.

There are a large number of possible configurations of electron sources and orientation of those sources about target fusion material that will achieve the required conditions defined above.

The foregoing discloses active optimization of controlled fusion reactions relative to the degree of degeneracy of the fusion plasma. This is accomplished by changing the electron temperature to alter the ratio of ion temperature ($T_i$) to electron temperature ($T_e$), and selective introduction of specified amounts of electrons in the reaction. These modifications allow enhancements of the preignition conditions of fusion reactions to be optimized for operation in various degenerate, partially degenerate, and non-degenerate states of plasma.

2. Temporally-Staged Pumping of Fusion Reactions

Figure 6:
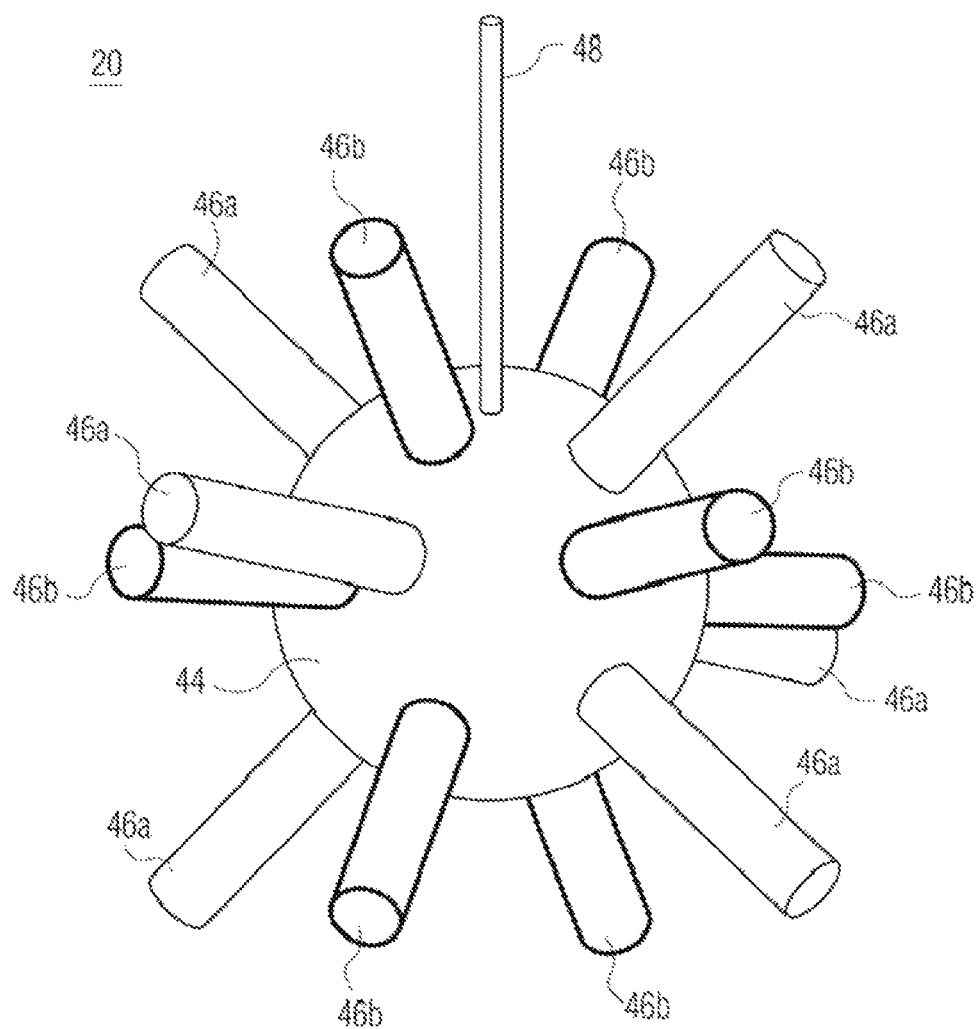
FIG. 6 shows a simplified perspective view of a preferred fusion reactor incorporating first and second sets of X-ray laser drivers.

The second technology, relating to temporally-staged pumping of fusion reactions, may be used with the system described in the '132 publication. The principle of the temporally-staged pumping is also applicable to other inertial confinement fusion systems. In the '132 publication, the reactor has a plurality of X-ray laser drivers. While the drawings of the '132 publication only show 6 symmetrically arranged drivers, the text contemplates higher numbers, the next logical number of drivers being 14 as shown in present FIG. 6 as temporally-pumped fusion reactor 70. The present embodiment of the invention employs a temporally-staged pulse train to drive the fusion reaction. The primary set of X-ray lasers 46a (i.e., the 6 lasers located on 3 orthogonal axes as shown in the '132 publication) fire first. The second set 46b (the remaining 8) fire a short, predetermined period of time later. For clarity of illustration, the second set 46b is shown with a thicker line than the first set 46a.

The period of time between the groups of pulses is a critical value. If the second pulse group arrives too soon, it merges with the first pulse group and there is no opportunity to remediate hydrodynamic instability. It is possible to operate the reactor with all pulse groups simultaneous (zero delay between pulses), which is the condition contemplated by the '132 publication. In contrast, the present embodiment contemplates an adjustable system which allows temporally separating the pulses into symmetrical sets slightly separated in time. If the separation is too great, the second pulse will arrive after the reaction has either:

(1) collapsed,
(2) passed a "point of no return" after which it is impossible to correct instabilities, or
(3) the full fusion reaction has occurred and the second pulse is unnecessary or detrimental To quantify the foregoing timing concerns, the total time of the reaction is defined by the time the first symmetrical X-ray compression pulse group first hits the fuel pellet to the time when thermonuclear fusion occurs. If, for example, the total time of the reaction is 3 nanoseconds, the second pulse group would, for example, arrive approximately 500 picoseconds after the first pulse group. If the second pulse group arrives more than about 1.5 nanoseconds after the first pulse group, it may be too late. If it arrives 10 nanoseconds after the first pulse, it is definitely too late to be of use. The values given here are relative and are intended merely to express a principle, not to define actual values for conducting a fusion reaction.

FIGS. 7A-7D show relative time lines of temporally-staged pulses of energy for establishing preignition conditions for a fusion reaction.

Figure 7A:
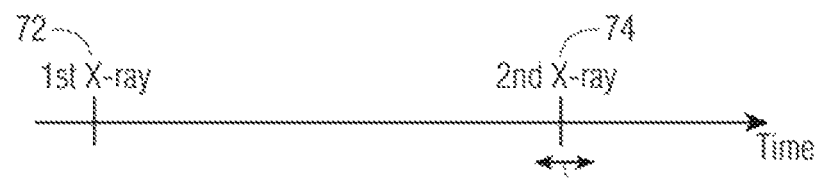
FIGS. 7A-7D are timing diagrams illustrating temporally-staged preignition conditions of fusion reactions.

FIG. 7A: This figure depicts first 72 and second 74 X-ray pulses. Double-headed arrow 75 indicates that the second pulse 74 can occur over a variable period of time.

Figure 7B:
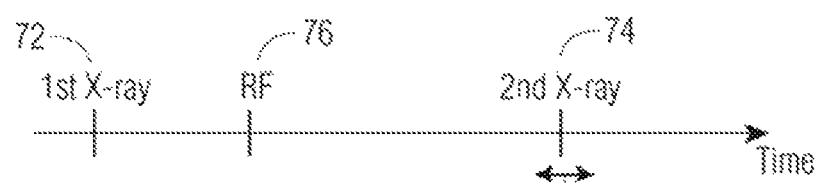

FIG. 7B: This figure depicts first 72 and second 74 X-ray pulses, with an RF heating pulse 76 following the first X-ray pulse 72 by a fixed period of time. Double-headed arrow 75 indicates that the second pulse 74 can occur over a variable period of time.

Figure 7C:
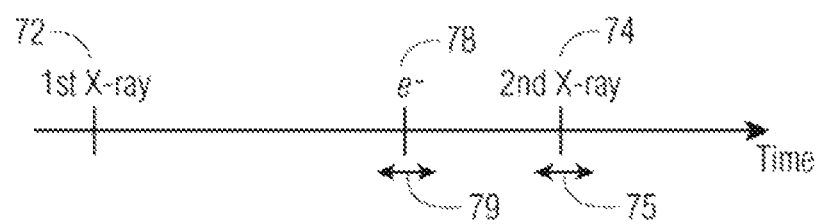

FIG. 7C: This figure depicts first X-ray pulse 72 followed by an electron pulse 78 and second X-ray pulse 74. Double-headed arrow 75 indicates that the second pulse 74 can occur over a variable period of time. Double-headed arrow 79 indicates that the electron pulse 78 can occur over a variable period of time to allow adjustment of the timing and synchronization.

Figure 7D:
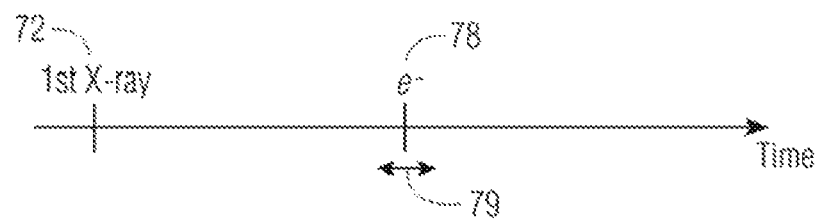

FIG. 7D: This figure depicts first X-ray pulse 72 followed by an electron pulse 78. Double-headed arrow 79 indicates that the electron pulse 78 can occur over a variable period of time.

Figure 8:
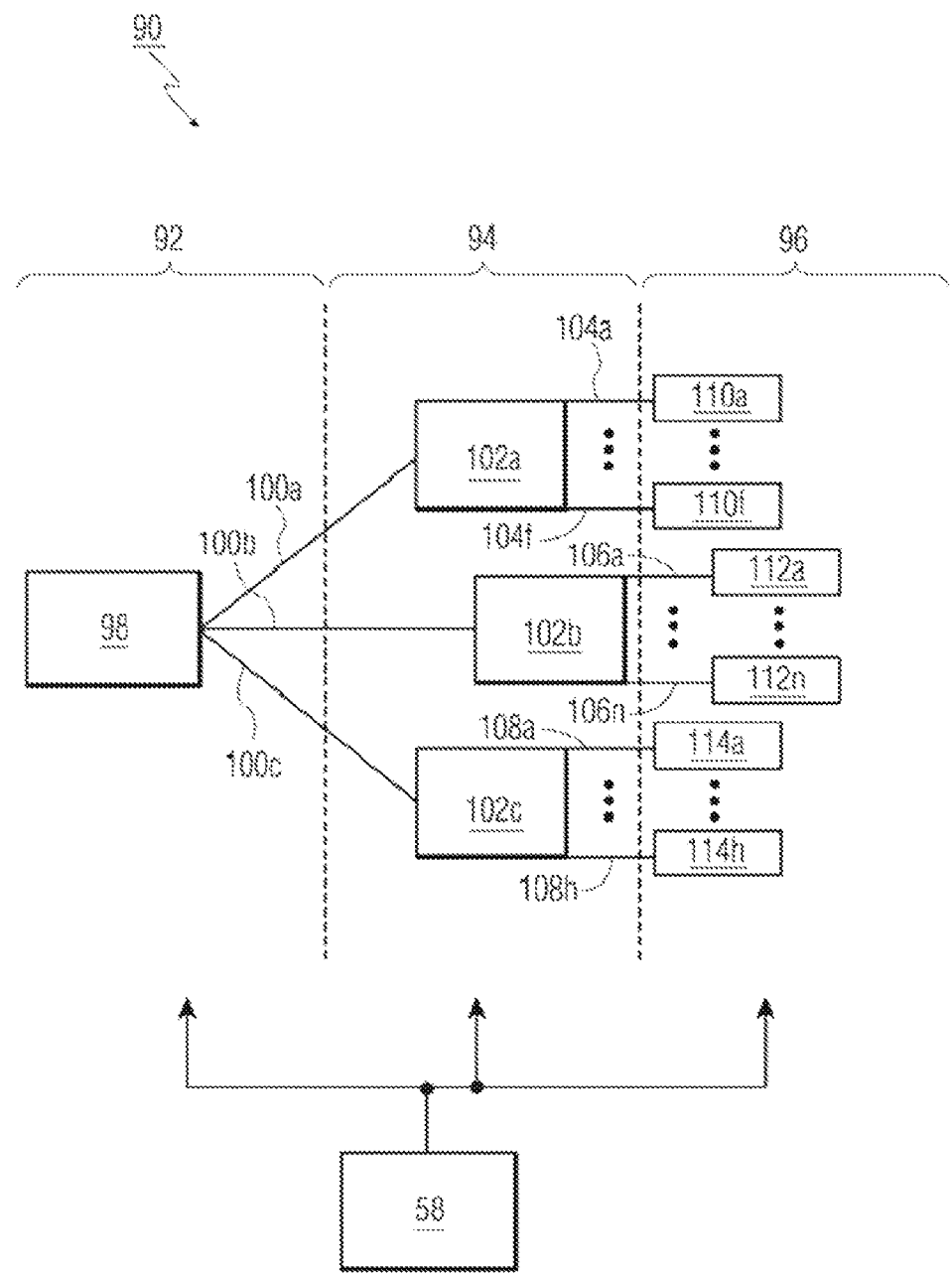
FIG. 8 shows a block diagram of a timing network for creating a coordinated stream of timing pulses for operation of the present invention.

The foregoing description teaches relative relationships between various pulse combinations, providing a sense of the proportions involved. Such description indicates that it is desirable to be able to provide drive signals that can be broken into two or more groups. This advantageously allows the variable timings indicated by double-headed arrows 75 and 79 in FIGS. 7A-7D (and also in FIGS. 10A-10B described below) to be accurately adjusted with a fine (e.g., picosecond or smaller) resolution. As shown in FIG. 8, this can be accomplished by creating a timing network 90 using commercially available timing delay generators such as those manufactured by Highland Technologies Inc. of San Francisco, Calif. The timing network 90 comprises three sections: a clock section 92, a timing section 94, and cable & jitter compensation section 96. The clock section 92 comprises a master clock 98, such as a high precision low-jitter oscillator. The master clock generates the timing pulses for the entire system. The master clock 98 is typically a temperature-controlled crystal oscillator, but could also be an atomic clock. It is connected to the timing section 94 by an array of preferably equal-length cables 100a, 100b and 100c. The length of these cables is preferably controlled to 0.001 inch (25.4 microns) overall, including connectors.

The timing section 94 comprises three timing delay generators 102a, 102b and 102c. Timing delay generator 102a establishes the firing time of the first X-ray pulse. Timing delay generator 102b establishes the firing time of the electron pulse, if present in the system. The timing of the electron pulses is predetermined by the system operator, as shown in FIG. 7C at 79. Timing delay generator 102c establishes the delay of the second X-ray pulse relative to the first X-ray pulse, as shown in FIGS. 7A-7C, and also in FIG. 10A, to be described below. The flow and quantity of electrons 10 are regulated by the control of the grid 18 (FIG. 2) under control of the host computer 58.

Figure 9:
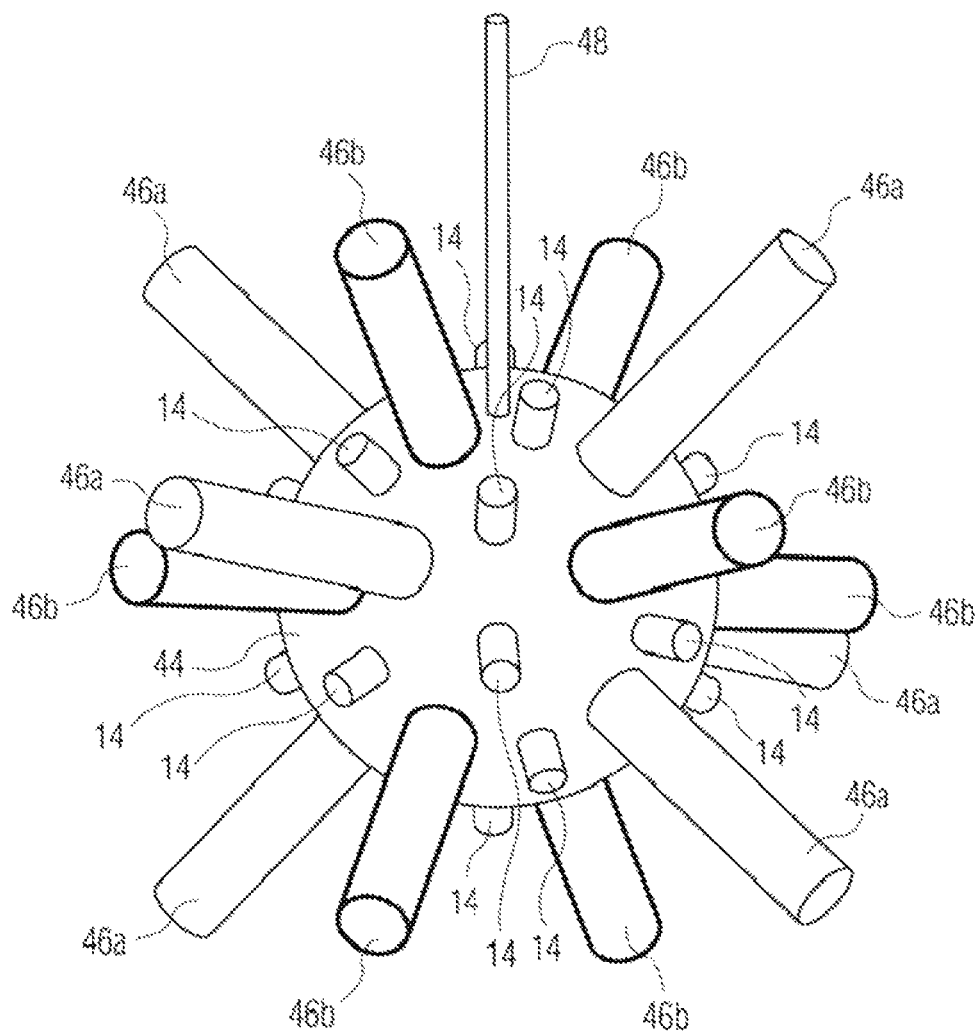
FIG. 9 shows a simplified perspective view of a preferred fusion reactor incorporating first and second sets of X-ray laser drivers and separate electron guns.

The timing delay generators of section 94 are connected to an array of cable and jitter compensation delay generators in section 96. Cable compensation, as used herein, provides a means for correcting for the differences in length of cables 104a-104f, 106a-106n (where n is the number of electron guns 14 used) and 108a-108h to assure that pulses arrive synchronously at the first set 46a of X-ray lasers, electron guns 14, or the second set 46b of X-rays lasers, respectively. Jitter compensation, as used herein, provides a means for correcting for small differences when manufacturing lasers 46 (FIG. 3), or sets 46a and 46b (FIG. 9) of lasers or electron guns 14 (FIGS. 2, 3 and 9. Each device has its own jitter value, which does not change with time, and is treated similarly to an offset for cable-length compensation.

In use, the delays for cable compensation and jitter section 96 delays are set first. Then, the timing adjustments of timing section 94 are set to provide the desired operating sequence as shown in FIGS. 7A-7D and 10A-10B. The timing delay generators 102a-102c, 110a-110f, 112a-112n (where n is the number of electron guns 14 used) and 114a-114h, and the master clock 98, each of which is connected to the host computer 58, are controlled by the host computer 58. This allows for rapid optimization of the timing conditions by a series of iterative measurements during the start-up of the system.

The system design allows for multiple-input means to the timing network 90 and electron gun controller 50, which can include direct manually controlled inputs by an operator or programmed controlled inputs by the host computer 58.

a. Hydrodynamic Instability

Beneficially, the present technique of temporally-staged pumping of fusion reactions is anticipated to allow a reduction in the accuracy of the fabrication of the fuel pellets. Currently, it is necessary to limit surface discontinuities to less than 1% of the total surface to reduce the formation of "jets" of plasma that surge outwardly from the main body of the plasma and locally cool the plasma. Such jets of plasma are characteristic of hydrodynamic instability. The $2^{nd}$ temporally-staged X-ray pulse 74 of FIGS. 7A-7C and FIG. 10A (and additional temporally-stage pulse(s) if employed) of the current embodiment of the invention act to contain the jets characteristic of hydrodynamic instability as they form. Therefore, greater surface discontinuities of fuel pellets can be tolerated.

It will be obvious to those skilled in the art from the present specification that each set of lasers should be capable of delivering the full drive energy required to achieve fusion. This is not absolutely necessary, but if each set only has a portion of the required energy, this places further restrictions on the timing tolerances of the system, since, in this condition, both pulses must arrive within a specified time window. The object of the current embodiment of the invention is to reduce the sensitivity of the overall fusion reaction to hydrodynamic instabilities, so providing each group of symmetrical pulses with the full drive energy capacity is desirable and preferred.

It is possible that more than two temporally-staged groups of drive pulses may be required to mitigate the effects of hydrodynamic instability and the system architecture can provide for this. It will be obvious to those skilled in the art from the present specification that there are a number of possible variations of this technique which can act to favorably reduce the negative effects or amount of hydrodynamic instability in inertial confinement fusion reactions.

3. Synergistic Combination of the Two Technologies

Figure 10A:
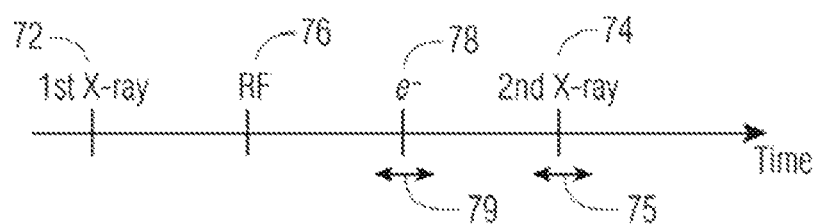
FIGS. 10A-10B are timing diagrams illustrating temporally-staged preignition conditions of fusion reactions.

Maximum utility and synergy is obtained by combining the two previously described technologies, as shown in FIG. 10A. While each individual process has its own unique attributes, when combined, a synergistic methodology emerges. The combined processes allow the following sequence of events as a means for triggering and controlling fusion reactions, with reference to FIG. 10A:

1. A first X-ray pulse 72 illuminates the fusion fuel. This totally ionizes the fuel, creating the plasma 12 (FIG. 1) and begins the compression and heating processes. An RF heating pulse 76 can optionally be applied to the fusion fuel plasma 12 a fixed time after the first X-ray pulse 72 is applied, as disclosed in the '132 publication.
2. An electron pulse 78 illuminates the fusion fuel region and introduces a specific number of electrons 10 (FIG. 1) of a specific energy into the plasma 12 (FIG. 1) produced by the foregoing Step 1. This has the effect of altering the ratio of ion temperature to electron temperature and minimizing deleterious effects as previously described, thus enhancing the probability of a desirable reaction occurring. The flow and quantity of electrons 10 are regulated by the control of the grid 18 (FIG. 2) under control of the host computer 58.
3. A second X-ray pulse 74 further compresses and heats the plasma 12 (FIG. 1). This second X-ray pulse 74 is composed of beams that arrive from different directions than the beams that form the first X-ray pulse 72. The effect of this is to contain and mitigate any hydrodynamic instability that may have formed during the preceding steps.
4. The timing and sequence of these three sets of pulses (i.e., 72 plus 76, 78, and 74) are important and must be adjusted carefully to achieve best system performance. This is accomplished by adjusting the delay generator 102b (FIG. 8) to control the timing of the generation of each set of pulses. The timing of the electron pulse 78 is adjusted as indicated by double-headed arrow 79, and the timing of the second X-ray pulse 74 is adjusted as indicated by double-headed arrow 75. The simplest method to optimize system performance is to use iterative optimization routines under the control of the host computer 58 (FIG. 8) to provide controlled input(s) to the timing network 90. The programming of such optimization routines will be apparent to those skilled in the art based on the present specification. Such optimization routines test individual delay setting combinations 75 and 79 of FIGS. 7A-7D and of FIGS. 10A-10B, described below, and are thus able to determine the combination of delay settings that yields the best system performance. Use of such computer routines to provide controlled inputs may be preferable to employing user-controlled inputs, such as 54 and 56 in FIG. 5 and 75 and 79 of FIGS. 7A-7D and of FIGS. 10A-10B.

Figure 10B:
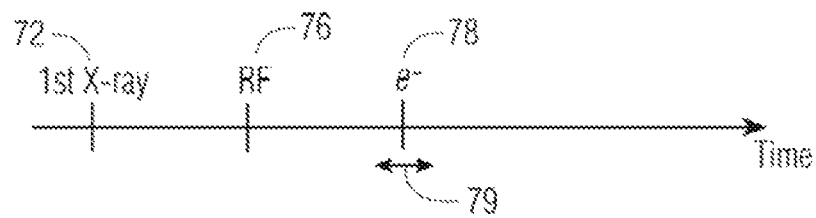

Variations on the foregoing sequence of steps illustrated in FIG. 10A are shown in FIGS. 7A-7D, as previously described, and in FIG. 10B.

FIG. 10B depicts first X-ray pulse 72 followed by an RF heating pulse 76, which follows the first X-ray pulse 72 by a fixed period of time, which, in turn is, followed by an electron pulse 78. Double-headed arrow 79 indicates that the electron pulse 78 can occur over a variable period of time.

All of the enhancements of this specification can be combined with the technology of the '132 publication to achieve improved control of the preignition conditions of a thermonuclear fusion reaction.

Preferred Embodiment

While the techniques discussed above are applicable to many different types of fusion processes, either singly or in combination, they were originally conceived as adjuncts to the invention described in the '132 publication. As such, they are particularly preferred techniques, which are now described in more detail as follows, with reference to the present drawings of the current invention.

The '132 publication describes a unique system for controlling some preignition conditions of fusion reactions. It is classed as a Direct X-ray Drive Inertial Confinement fusion system. It utilizes X-ray lasers 46 (FIG. 3) as the primary means of pumping the reaction. The current invention describes system-level enhancements which further promote the ability to exercise control of preignition conditions of a fusion reaction.

The system of the '132 publication includes a central target chamber 44 (FIG. 3) for receiving fusion target material. A plurality of X-ray lasers 46 (FIG. 3) are arranged around the target chamber 44 so as to supply energy to fusion target material in the chamber to initiate a controlled fusion reaction of the material, releasing energy in the forms of fusion plasma 12 (FIG. 1) and heat.

In more detail, FIG. 3 shows a reactor for generation of energy by controlled nuclear fusion. The system includes a central target chamber 44. A series six or more X-ray lasers 46 are arranged in symmetrical pairs around the central target chamber 44. The symmetrical X-ray lasers 46 are arranged in symmetrical manner about a target pellet location at the center of chamber 44, so as to collectively create a preferably highly spherical wavefront that impinges on the target fusion pellet (not shown) at the center of chamber 44. The X-ray lasers 46 produce X-ray beams 72 (FIGS. 7A-7D and FIGS. 10A-10B) at high fluency, which symmetrically compress the target to initiate and sustain a fusion reaction. The X-ray lasers 46 are preferably Stimulated X-ray Emitters (SXE) as first described by the inventor of this current invention in U.S. Pat. No. 4,723,263. In the preferred embodiment, the mentioned SXE X-ray lasers 46 are fitted with an RF producing means (not shown) which provides a simultaneous pulse of RF energy 76 (FIGS. 7B, 10A and 10B) to provide additional heat to the reaction. This is described further in the '132 publication in its discussion of FIGS. 10-13 of that publication.

Optimal performance of any fusion system depends on creating a perfectly symmetrical compression of the fuel target pellet. The X-ray lasers 46 (FIG. 3) of the current invention provide a means of symmetrically illuminating the target. If the wavefronts (not shown) that impinge on the target are given a concave geometry whose radius matches the radius of the target pellet, then it is possible to create an almost perfectly symmetrical compression wavefront on the fuel target pellet. The reason that this is necessary is to minimize hydrodynamic instability which, if severe enough, can cause the fuel pellet to heat in a non-uniform fashion and thus not ignite in a fusion reaction. An aspect of the current invention advantageously utilizes the concave geometry of the wavefronts in a temporally-staged manner to further minimize the negative effects of hydrodynamic instability. This is accomplished by use of a second X-ray pulse 74 slightly delayed in time with reference to the first X-ray pulse 72 (FIGS. 7A-7C and FIG. 10A). The combined, temporally-staged wavefronts 72 and 74 of the energy beams approximate two collapsing spherical shells.

The implosion process of a typical direct-drive ICF target is roughly divided into three phases:
(1) initial phase,
(2) acceleration phase, and
(3) deceleration phase.

In the initial phase, a first shock wave travels in a fuel pellet and the pellet is accelerated mainly by the shock wave. The initial phase has a second requirement: total ionization of the fuel. This promotes the fusion reaction by increasing the ease with which the fusion fuel ions are combined in the subsequent phases. This is accomplished by the high energy impinging X-rays knocking the electrons out of their orbits and leaving a bare nucleus, which is the preferred state for fusing to other nuclei. The outer (or ablative) shell is ablatively accelerated inward in the second phase. Then, fuel is compressed heavily in the deceleration phase. In the initial phase, perturbations on the target surface are seeded by initial imprint due to laser irradiation nonuniformity, along with the original target surface roughness. The perturbations grown on the outer surface due primarily to the hydrodynamic instability in the second (acceleration) phase are then fed through on the inner surface.

In the current embodiment of the invention, with reference to FIG. 7C, the use of temporally-staged pulses is preferably sequenced to the three stages described above. The initial X-ray pulse 72 starts the process in the initial phase. It is preferably closely followed by the electron pulse 78 at the beginning of the acceleration phase. Synchronization of the electron pulse 78 is achieved by use of the grid 18 (FIG. 2). The second X-ray pulse 74 preferably closely follows the electron pulse during the early portion of the acceleration phase. This sequence allows the electrons to optimally interact with the plasma created by the initial impact of the first X-ray pulse 72. This action prepares the plasma 12 (FIG. 1) for optimal compression and ultimately, a fusion implosion. The second X-ray pulse 74 also acts to minimize any hydrodynamic instabilities that may occur during the initial and acceleration phases.

In an alternate embodiment of the current invention, the system of the '132 publication may include an RF heating means integral to the X-ray lasers 46 (FIG. 3) to produce an RF pulse 76 (FIGS. 7B, 10A and 10B). One consequence of this is that an RF heating pulse 76 of over 200 MegaJoules at a specified frequency in excess of 150 GHz is synchronously produced and travels along with the X-ray pulse 72. This RF pulse 76 is useful in providing additional heat to the plasma 12 (FIG. 1) at essentially no additional cost or energy consumption. This is because it is generated using the excess energy of the SXE X-ray lasers 46 X-ray production process. This RF pulse 76 is slightly delayed behind the X-ray pulse 72 by a fixed period of time. By having the RF pulse 76 occur just behind the first X-ray pulse 72, it arrives more or less synchronously with the electron pulse 78. Preferably, a controlled input to timing network 90 (FIG. 8) via the host computer 58 (FIG. 8) allows the timing of these events to be fine tuned to optimize this effect (FIG. 10A). This produces a four-part pulse train as shown in FIG. 10A, which increases the degree of control over preignition conditions of the fusion fuel for creating optimal conditions for igniting the fusion fuel.

The present specification discloses six separate enhancement scenarios for inertial confinement fusion (ICF) systems:
1. Temporally-Staged X-ray pulses (FIG. 7A).
2. Combined Temporally-Staged X-ray Pulses and RF Enhanced plasma (FIG. 7B).
3. Combined Temporally-Staged X-ray Pulses and Electron Enhanced plasma (FIG. 7C).
4. Electron Enhanced plasma (FIG. 7D).
5. RF and Electron Enhanced plasma (FIG. 10B).
6. Combined Temporally-Staged X-ray Pulses and RF and Electron Enhanced plasma (FIG. 10A), the preferred embodiment.

Individually, each technique has merit. In the various combinations, they offer successively increasing degrees of enhancement and control over the preignition conditions of a fusion reaction.

While the invention has been described with respect to specific embodiments by way of illustration, many modifications and changes will occur to those skilled in the art. In this connection, the word "means" used herein connotes singular or plural instrumentalities, regardless of whether the verb used with the term "means" is normally of singular or plural tense. The second set of X-ray sources for producing a second X-ray pulse would not be present in some systems. It is, therefore, to be understood that the appended claims are intended to cover all such modifications and changes as fall within the true scope and spirit of the invention.

What is claimed is:

1. A method for applying temporally spaced X-ray pulses to inertial confinement fusion target material, comprising:
   a) providing a central target chamber for receiving a spherical fusion fuel pellet of an inertial confinement fusion target material and at least first and second pluralities of energy drivers arranged in symmetrical pairs about the pellet and oriented to respectively apply first and second temporally-spaced groups of symmetrical pairs of X-ray pulses onto the fusion target material in a 3-dimensionally symmetric manner about the pellet;
   b) applying a first group of X-ray pulses onto the fusion fuel pellet for the purpose of creating, compressing and heating a fusion fuel-derived plasma; and
   c) applying a second group of X-ray pulses after an interval of time from when the first group of X-ray pulses is applied; the second group of X-ray pulses, arriving from different directions from the first group of X-ray pulses, for further compressing and heating of the fusion fuel-derived plasma.

2. The method of claim 1, further including a step of fine tuning said interval in picosecond or finer increments via controlled input.

3. The method of claim 1, wherein the first plurality of energy drivers consists of six energy drivers located on three orthogonal axes, and the second plurality of energy drivers consists of eight energy drivers.

4. The method of claim 1, wherein the steps of applying the first and second groups of X-ray pulses are steps of an iterative optimization routine for optimizing said interval of time for use when the central target chamber receives a further spherical fusion fuel pellet of an inertial confinement fusion target material.

* * * * *